Feb. 12, 1924.   1,483,585
J. KINCHELOE
VALVE
Filed Aug. 22, 1922

INVENTOR
JOHN KINCHELOE
BY
Frank Waterfield
ATTORNEY

Patented Feb. 12, 1924.

1,483,585

UNITED STATES PATENT OFFICE.

JOHN KINCHELOE, OF FRESNO, CALIFORNIA.

VALVE.

Application filed August 22, 1922. Serial No. 583,634.

*To all whom it may concern:*

Be it known that I, JOHN KINCHELOE, a citizen of the United States, and resident of Fresno, in the county of Fresno, State of California, have invented certain new and useful Improvements in Valves, of which the following is a specification.

My invention relates primarily to a valve for use in irrigating systems and the like, although I do not limit myself to such use. Heretofore, in the use of faucets, valves and the like, particularly in irrigating systems and other isolated places, considerable trouble and wastage of water has been experienced owing to unauthorized persons neglecting to shut off the water after using the same, and it is one of the objects of my invention to provide a valve or faucet which cannot be molested by unauthorized persons.

Other objects and advantages will appear hereinafter and, while I have shown and will describe the preferred form of my invention, I wish it understood that I do not limit myself to such preferred form, but that various changes and adaptations may be made therein without departing from the spirit of my invention.

In the drawings accompanying and forming a part hereof:

Figure 2:
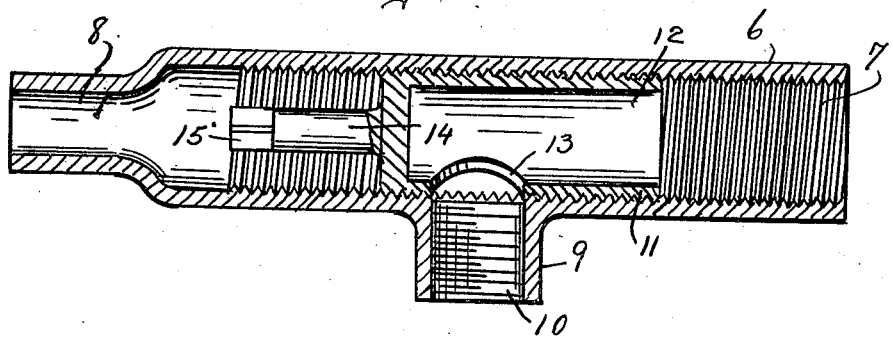
Fig. 2 is a central longitudinal section through Fig. 1.

Referring to the drawings, my device comprises a tubular casing 6 provided with an inlet chamber 7 at one end thereof, and having its other end 8 reduced in size for a purpose to be hereafter explained. Extending from one side of casing 6 is an integral casing 9 provided with an outlet chamber 10 which normally communicates with chamber 7. The interior of chamber 7 is screwthreaded for the greater portion of its length and in this screwthreaded portion is revolubly mounted the shut off member 11 in screwthreaded connection therewith. Member 11 is provided with an inlet chamber 12, closed at one end, and provided in the side of chamber 12, near its closed end, is an outlet opening 13 which is of a size corresponding to the size of outlet 10. Extending from the closed end of member 11 is a member 14, the free end 15 of which is squared for the reception of a wrench or key.

Figure 1:
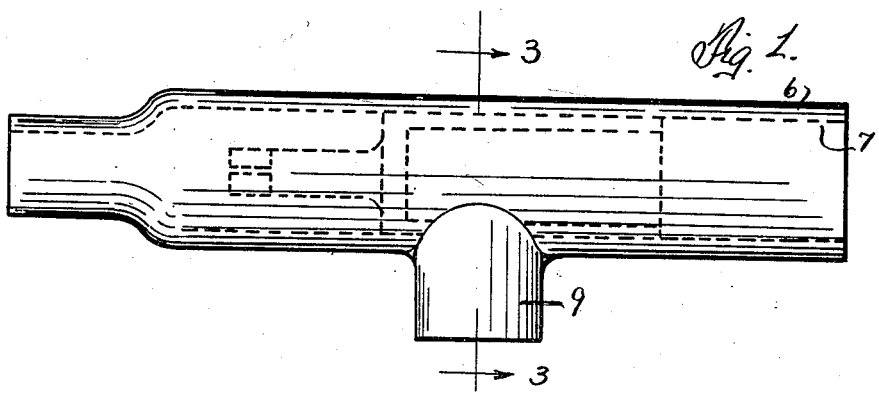
Fig. 1 is a side elevation of one form of my valve.
Figure 3:
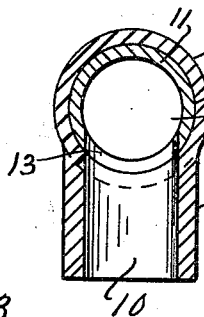
Fig. 3 is a section on the line 3—3 of Fig. 1.
Figure 4:
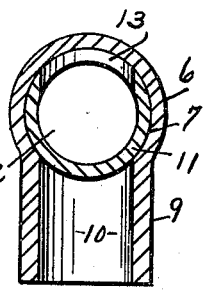
Fig. 4 is a view similar to Fig. 3 with the valve in its inoperative position.
Figure 5:
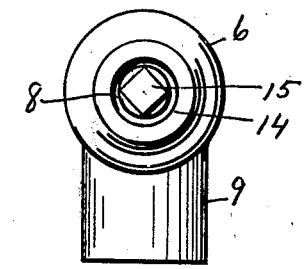
Fig. 5 is a left hand elevation of Fig. 1.

In the operation of my device the parts will be in the positions shown in Figs. 1, 2 and 3, when water is flowing therethrough. When it is desired to shut off the flow of water therethrough a suitable wrench or key will be inserted through opening 8 in casing 6 to engage the squared end 15 of member 14 and member 11 will be rotated one-half a revolution to bring opening 13 out of register with opening 10. The key will then be removed. When it is desired to permit the water to flow the key will be reinserted through opening 8 and member 11 rotated to bring opening 13 into register with opening 10.

Having described my invention, what I claim is:

1. A valve comprising a tubular body having one of its ends reduced to form a narrow concentric neck and being interiorly screwthreaded for the major portion of its length opposite said neck; a tubular projection from the side of said body centrally of its length in communication with the interior thereof and being interiorly screwthreaded; a cup-shaped valve mounted within said body in screwthreaded engagement therewith and having an opening in the side thereof adapted to coact with the opening in said projection; a valve stem projecting from the closed end of said valve centrally thereof towards said neck having its free end squared and terminating at a distance from said neck within said body.

2. A valve comprising a substantially T-shaped hollow body member having one of the ends of the longer leg thereof reduced in size to form a narrow concentric neck and being interiorily screwthreaded throughout except at said reduced end; an exteriorly screwthreaded cup-shaped valve having an opening in the side thereof mounted within said body member with the closed end thereof extending towards said reduced end; a valve stem for said valve extending centrally from the closed end thereof towards said neck and having its free end squared; said body, valve and stem being so proportioned and arranged that when positioned for use said stem is inclosed within said body member at a distance from said neck.

3. A valve comprising a tubular body having one of its ends reduced to form a narrow concentric neck and being interiorly screwthreaded for the major portion of its length opposite said neck; a tubular projection from the side of said body centrally of its length in communication with the interior thereof and being interiorly screwthreaded; a cup-shaped valve mounted within said body in screwthreaded engagement therewith and having an opening in the side thereof adapted to coact with the opening in said projection; a valve stem projecting from the closed end of said valve centrally thereof towards said neck having its free end squared and terminating at a distance from said neck within said body; and detachable means adapted to be passed through said neck to engage said stem to rotate said valve.

4. A valve comprising a tubular casing having one end reduced in size to form a narrow concentric neck and an opening in the side thereof centrally of its length and being interiorly screwthreaded throughout except at said neck; a cup-shaped valve mounted within said casing in screwthreaded engagement therewith having an opening in the side thereof, adapted to be brought into register with the side opening of the casing and having a stem; said casing and valve being so proportioned and arranged that said valve stem is always inclosed within said casing at a distance from said neck.

In witness that I claim the foregoing I have hereunto set my hand this 7th day of August, 1922.

JOHN KINCHELOE.